June 11, 1957 W. R. SLIVKA ET AL 2,795,394
TURBINE BLADE ARRANGEMENT
Filed Jan. 26, 1954

INVENTORS
William R. Slivka and
David H. Silvern
BY
Walter A. Paul
ATTORNEYS

2,795,394

TURBINE BLADE ARRANGEMENT

William R. Slivka, Trenton, N. J., and David H. Silvern, Detroit, Mich.

Application January 26, 1954, Serial No. 406,370

1 Claim. (Cl. 253—77)

(Granted under Title 35, U. S. Code (1952), sec. 266)

This invention described herein may be manufactured and used by or for the Government of the United States of America for governmental purposes without the payment of any royalties thereon or therefor.

The present invention relates to a turbine having stator and rotor blades and more particularly to turbine structure in which the stator blades are twisted and the rotor blades are non-twisted; and is a continuation in part of our application 289,417, filed May 22, 1952, now Patent No. 2,757,902, dated August 7, 1956.

Prior to the present invention the practice was to use either twisted rotor blades or non-twisted rotor blades with non-twisted stator blades. This earlier use of non-twisted rotor blades was in early steam turbine designs in which radial variation in flow conditions were disregarded with resultant loss of efficiency.

Structures with twisted rotor blades are very difficult to manufacture because of the close tolerances required, the high stresses involved, and the high operating temperature, and particularly so when internal rotor blade cooling must be provided. These structural problems are greatly simplified by the present invention in which the rotor blades are non-twisted for simplicity in fabrication and the stator blades are twisted from the hub to the tip to keep losses low and the efficiency of the turbine assembly high as compared to that of a turbine having non-twisted stator blades and non-twisted rotor blades.

In the past it was thought that free vortex flow turbine designs were far superior to any other configuration conceivable, and that the stator exit angles must be increased towards the tip for minimum shock losses. The present invention opposes this and a further object of this invention is to provide an efficient turbine using principles contrary to the generally accepted beliefs mentioned above, our invention including a non-twisted rotor in conjunction with a stator whose exit angles are such that no shock losses occur at the rotor inlet and optimum efficiency results, and the stator exit angles decreasing towards the tips for minimum shock losses.

With these and other objects in view, as will hereinafter more fully appear, and which will be more particularly pointed out in the appended claim, reference is now made to the following description taken in connection with the accompanying drawings in which:

Figure 1:
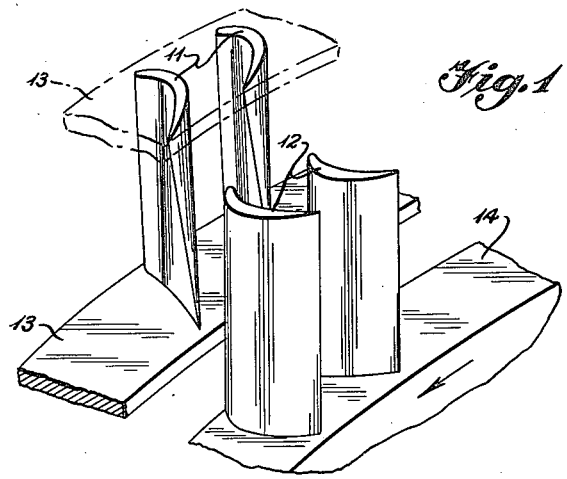
Fig. 1 is a schematic perspective view of a segment of the rotor and stator assemblies of a turbine embodying the instant invention.
Figure 2:
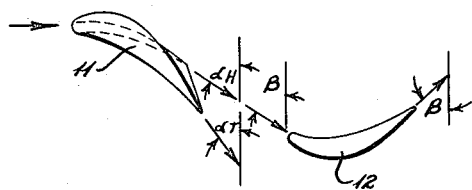
Fig. 2 is a diagrammatic view showing the relative disposition of a typical stator blade and a typical rotor blade arranged according to the teachings of the instant invention.

There are in Fig. 1 twisted stator blades 11 fixedly mounted in a non-rotating stator 13, and non-twisted rotor blades 12 fixedly mounted on a rotor 14. The trailing edge of each stator blade is twisted from the hub to the tip as indicated in Fig. 1 and shown more specifically in Fig. 2, the angle $\alpha_T$ at the blade tip being less than angle $\alpha_H$ at the hub, where $\alpha$ is the angle at any radius $r$ from the rotor axis measured from the tangential direction; i. e., the angle between a tangent to a circle in a plane perpendicular to the rotor axis with the rotor axis as the center and said plane touching the trailing edge of the stator blade, and a tangent to the trailing edge of the stator blade in the direction of airflow, said tangents lying in the same plane. In Fig. 2, $\beta$ is the rotor inlet angle; i. e., the angle between a tangent to a circle in a plane perpendicular to the rotor axis with the rotor axis as center and said plane touching the leading edge of the rotor blade, and a tangent to the leading edge of the rotor blade in the direction of airflow, said tangents being in the same plane. In fact, according to the present invention, the stator blades are twisted in a predetermined manner in accordance with the following formula:

$$\frac{d\alpha}{dr} = \frac{-1}{r} \frac{\tan \beta - \tan \alpha}{\sec^2 \alpha} \times \frac{2 + \tan^2 \alpha}{1 + \tan \beta \tan \alpha}$$

where:

$r$ is the radius from the axis of the rotor to a differential airfoil element $\alpha$ is the varying stator exit angle measured from the tangential direction and $\beta$ is the constant relative rotor entrance angle.

Stator blades twisted substantially in accordance with this formula will result in the airflow entering the rotor blades with substantially zero angle of attack.

An analysis of the aerodynamics of the flow conditions in a turbine with stator exit angle variation as given above is presented in detail in the publication NACA TN2365 "Analytical Evaluation of Aerodynamic Characteristics of Turbines with Non-Twisted Rotor Blades" by William R. Slivka and David H. Silvern.

The stator exit angle variation as determined according to the above formula results in flow into a non-twisted rotor in a manner which results in low losses as compared with the results obtained with a non-twisted stator blade similarly employed.

A description of experimental results substantiating this is presented in the publication NACA RM E51 G14 "Experimental Investigation of the 0.8 Hub-Tip Radius Ratio Non-twisted Rotor Blade Turbine" by David H. Silvern and William R. Slivka.

The actual blade profiles are not part of the present invention because they are varied depending upon the specific application of a turbine in which they are being used. In some designs thick profiles are most desirable while in others thin profiles are more desirable. Irrespective of thickness of blade profile, any stator blade shaped according to this formula, or with small deviations from this formula to accomplish the same purpose, will yield exit air angle variation along its length resulting in efficient operating flow conditions in a turbine in which the rotor entrance angle is constant along the length of the rotor blade.

In operation, the combination of twisted stator blades and non-twisted rotor blades described herein results in increased efficiency because the increasing twist of the stator blades toward their tips produces an increased deflection of the flow to compensate for the increased velocity of the tips of the rotor blades as compared to the hub ends and to compensate for the decrease in gas velocities due to the radial pressure gradients.

Various modifications are contemplated and may obviously be resorted to by those skilled in the art without departing from the spirit and scope of the invention, as hereinafter defined by the appended claim.

We claim:

In a turbine, the combination of a rotor fitted with a plurality of rotor blades having substantially constant inlet and exit angles and a stator immediately upstream of said rotor fitted with a plurality of stator blades having exit angles which vary in accordance with the differential equation:

$$\frac{d\alpha}{dr} = -\frac{1}{r} \frac{\tan\beta - \tan\alpha}{\sec^2\alpha} \times \frac{2 + \tan^2\alpha}{1 + \tan\beta \tan\alpha}$$

where $\alpha$ is the stator exit angle measured from the tangential direction $r$ is the radius from the rotor axis $\beta$ is the constant rotor inlet angle measured from the tangential direction.

References Cited in the file of this patent

UNITED STATES PATENTS

| | | |
|---|---|---|
| 1,447,554 | Jones | Mar. 6, 1923 |
| 1,997,506 | Adamcikas | Apr. 9, 1935 |
| 2,444,966 | Troller | July 13, 1948 |